United States Patent [19]

Romero et al.

[11] Patent Number: 5,061,369

[45] Date of Patent: Oct. 29, 1991

[54] SUB-SOIL DOMESTIC WASTEWATER TREATMENT APPARATUS HAVING WEDGE SHAPED INCLINED SURFACES

[76] Inventors: Roland Romero, 1204 W. Main St., New Iberia, La. 70560; Joseph L. Miller, Rte. 13, Box 813, Lake Charles, La. 70611

[21] Appl. No.: 544,630

[22] Filed: Jun. 27, 1990

[51] Int. Cl.⁵ .............................................. B01D 21/02
[52] U.S. Cl. .................... 210/170; 210/221.1; 210/521; 210/532.2
[58] Field of Search ...................... 210/170, 220, 221.1, 210/232, 519, 521, 523, 532.1, 532.2

[56] References Cited

U.S. PATENT DOCUMENTS

| | | | |
|---|---|---|---|
| 3,051,315 | 8/1962 | Boester | 210/532.2 |
| 3,433,258 | 3/1969 | Steele | 210/532.2 |
| 3,741,393 | 6/1973 | Estes et al. | 210/532.2 |
| 4,172,799 | 10/1979 | Perry, Jr. | 210/532.2 |
| 4,224,155 | 9/1980 | Milne | 210/170 |

Primary Examiner—Robert A. Dawson
Assistant Examiner—Joseph Drodge
Attorney, Agent, or Firm—Joseph L. Lemoine, Jr.

[57] ABSTRACT

A sub-soil apparatus for treatment of domestic wastewater and sewage, such as that generated from single family residences, small apartment buildings, small offices and the like. The apparatus includes two contiguous chambers, the first chamber being a mixing/aeration chamber, and the second being a settling/separation chamber. A transverse wall with lower lateral passages divides the two chambers but allows liquid and solid exchange between the two chambers. The mixing/aeration chamber accepts the sewage to be treated, and turbulent mixing and aeration is achieved therein by a transverse aeration bar. After mixing and aeration, which results in biodegradation of the sewage, the biodegraded liquid, containing fine solids, passes into the settling/separation chamber where quiescent conditions promote solid settling. Three inclined walls of the settling/separation chamber direct settled solids back into the mixing/aeration chamber for further biodegradation. A multiple angle discharge fitting also discourages solids from entering the effluent line.

5 Claims, 4 Drawing Sheets

SUB-SOIL DOMESTIC WASTEWATER TREATMENT APPARATUS HAVING WEDGE SHAPED INCLINED SURFACES

BACKGROUND OF THE INVENTION

The invention herein disclosed relates to the field of containerized sub soil apparatus for aerobically treating relatively small discharges of domestic wastewater and sewage, such as that associated with single family homes, small apartment buildings, small office buildings and the like.

Ordinary domestic waste is comprised of solid materials and wastewater, both of which are typically highly, and quickly, biodegradable under certain conditions. In order to achieve rapid biodegradation of domestic sewage it is desirable to finely divide all solid wastes, homogeneously mix the finely divided particles with the liquid waste and aerate the mixture so as to promote the growth of aerobic bacteria which consume the wastes.

It is desirable that effluent being discharged have low solid content, and low bio-chemical oxygen demand, in order to conform with building and ecological standards.

It is desirable that domestic waste treatment plans be energy efficient and require little maintenance, both in terms of mechanical repairs or sludge removal.

SUMMARY OF THE INVENTION

The invention disclosed herein is a containerized domestic waste treatment plant suitable for sub-soil installation. The invention is a liquid containing vessel divided into two chambers by a transverse wall with lower lateral passages. Wastewater enters the mixing/aeration chamber. A transverse aeration bar in the mixing/aeration chamber is located near the bottom of said chamber, remote from the transverse wall. Air is pumped through said bar, producing turbulent mixing of solid and liquid waste, and, creates highly aerobic conditions in the mixing/aeration chamber. After biodegradation of the wastes in the mixing/aeration chamber, as more influent is received, a portion of the biodegraded wastes migrate through the passages in transverse wall, and enter the settling/separation chamber.

The transverse wall is sealed against the passage of liquids except at its lower lateral edges, and flow through the transverse wall is allowed only at lower lateral passages through the wall. Each lower lateral passage is substantially one fourth of the wall's width, and has a substantial height so as to prevent clogging by the occasional entry of a solid which is not finely divided.

In the settling/separation chamber the homogeneous liquid, containing finely divided solids, is received from the mixing/aeration chamber and gradually migrates upward, under quiescent conditions, to the discharge fittings near the top of the settling/separation chamber. During this quiescent migration most of the solid particles settle out of the liquid and are directed back into the mixing/aeration chamber by three inclined surfaces at the lower part of the settling/separation chamber. Before discharge the clarified liquid is directed through multiple turn fittings, to further discourage the passage of solids.

DESCRIPTION OF THE PREFERRED EMBODIMENT

Figure 1:
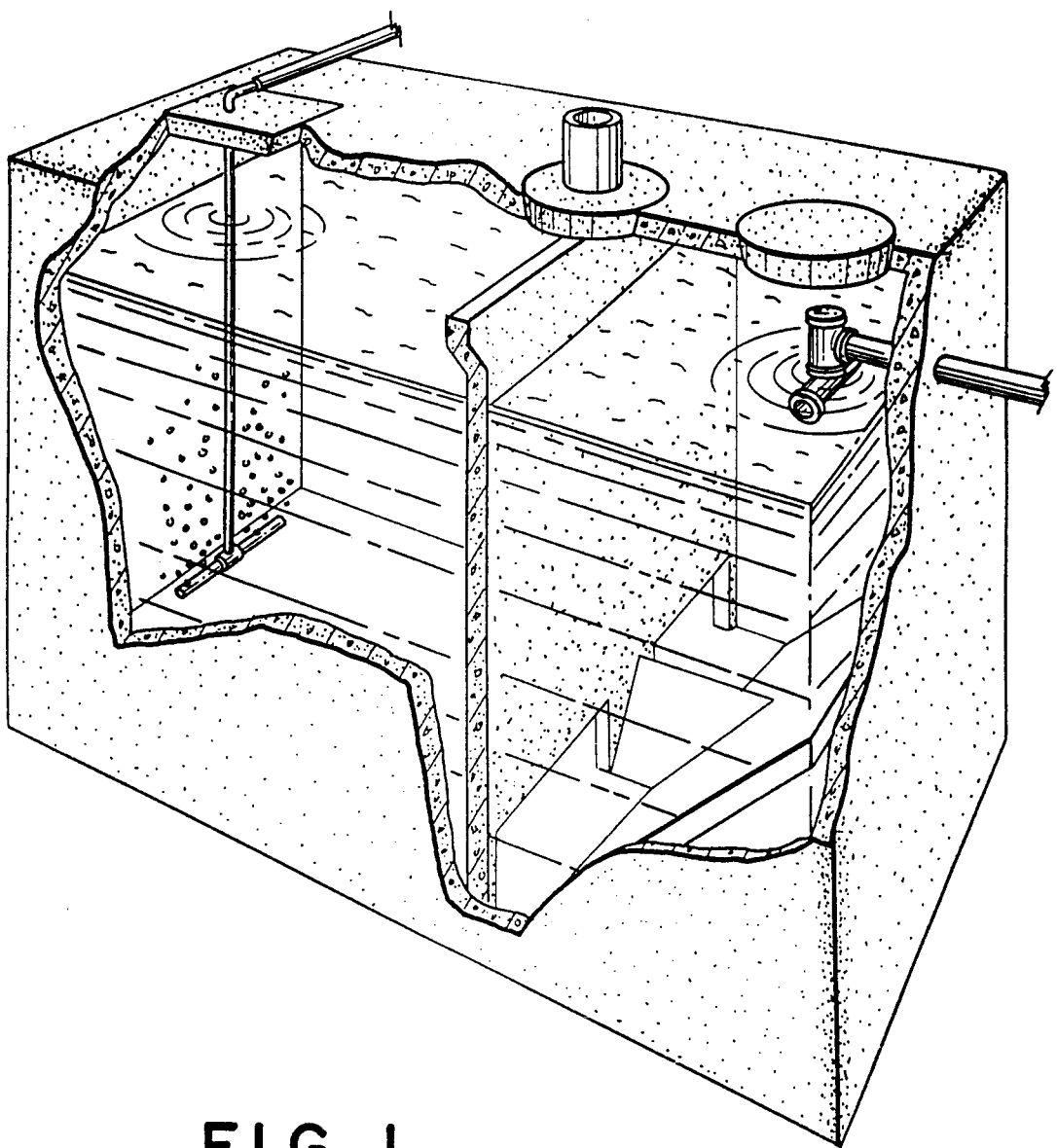
FIG. 1 is an isometric, pictorial, cutaway view of the preferred embodiment of the invention disclosed.
Figure 2:
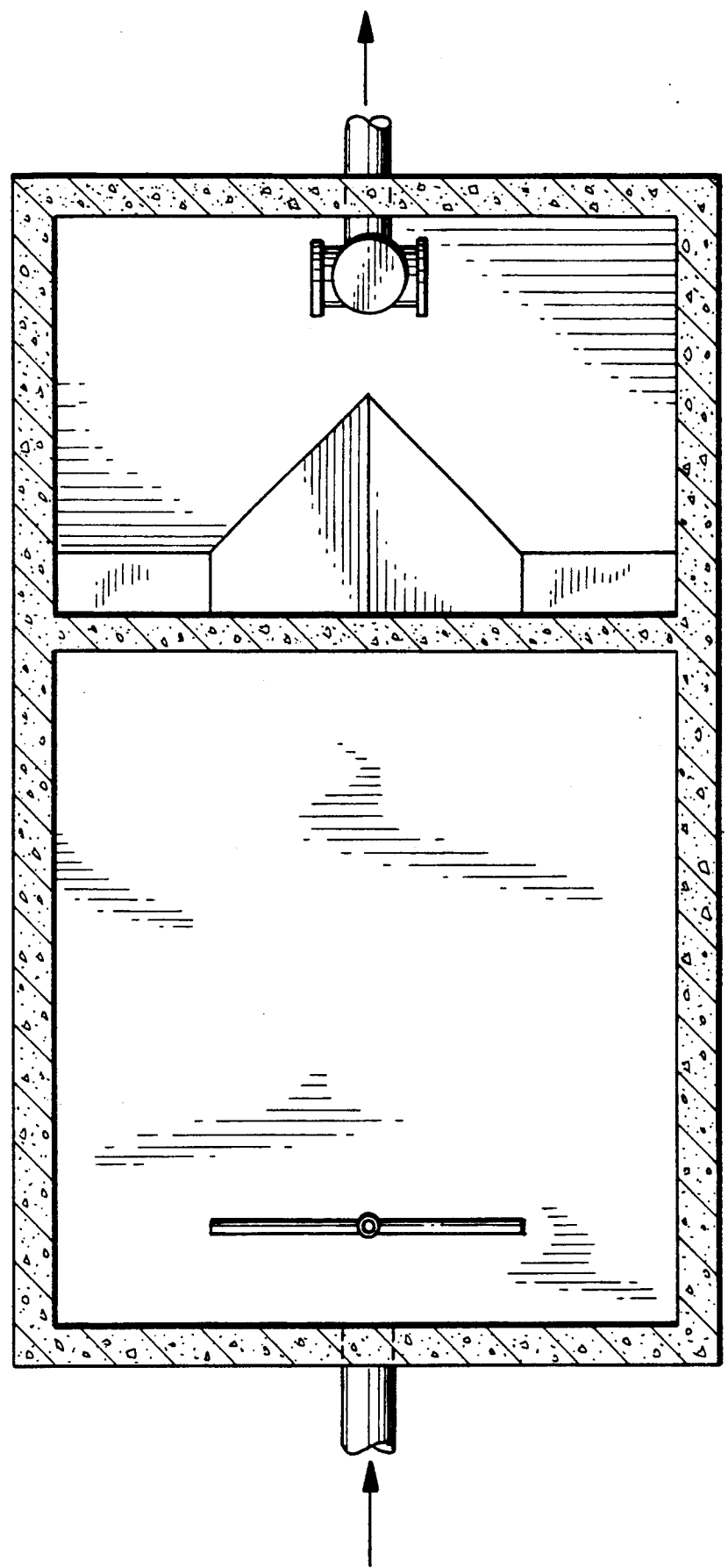
FIG. 2 is a side elevational cutaway view of the preferred embodiment of the invention disclosed.
Figure 3:
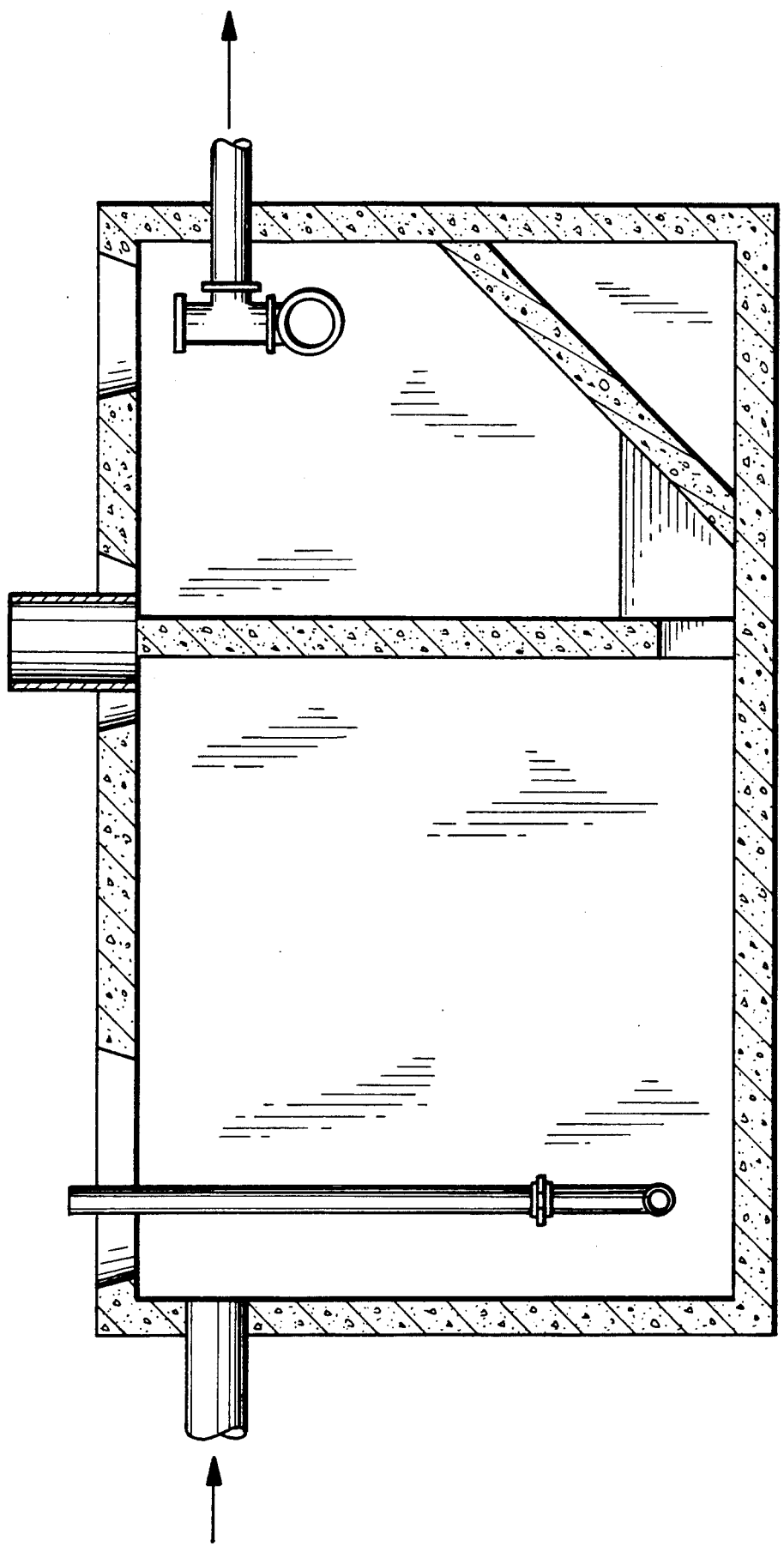
FIG. 3 is a top elevational cutaway view of the preferred embodiment of the invention disclosed.
Figure 4:
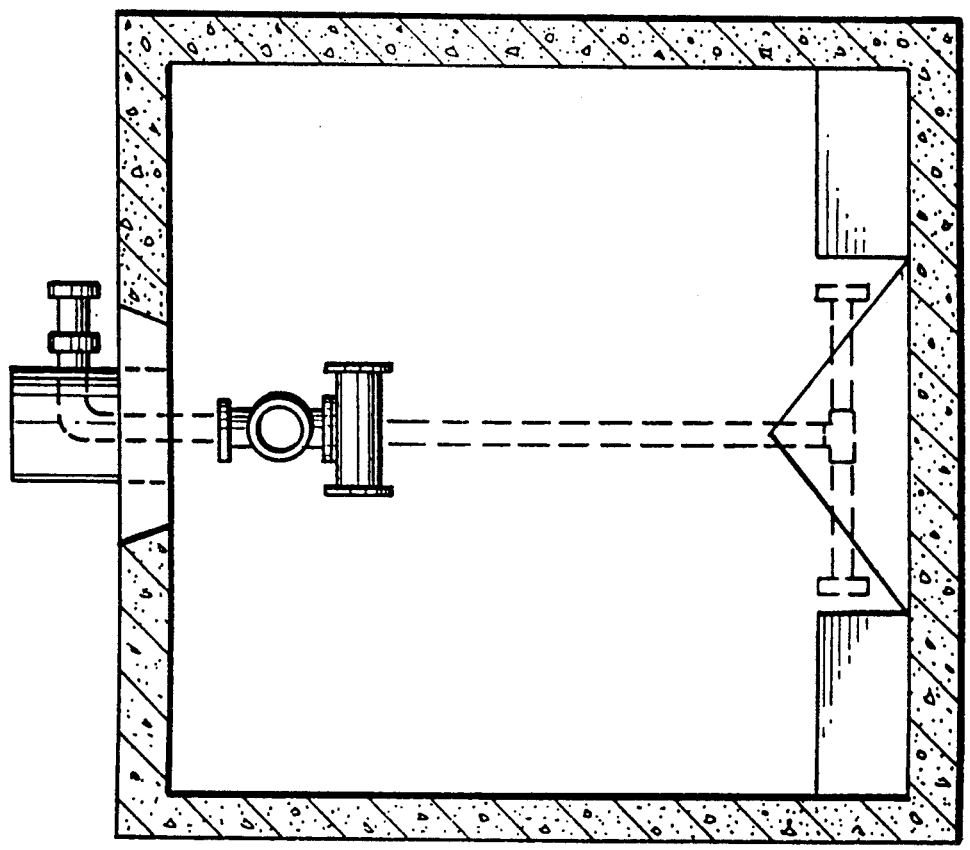
FIG. 4 is an end elevational cutaway view of the preferred embodiment of the invention disclosed.

The apparatus of the present invention includes a vessel, having floor 1, side walls 2 and 3, end walls 4 and 5, and top 6. Preferably side walls 2 and 3 are longer than end walls 4 and 5, thereby defining a vessel which is rectangular when viewed from above.

The vessel is divided into two chambers, influent chamber 7 and effluent chamber 8, by transverse wall 9.

The influent chamber 7 is equipped with influent line 10 which penetrates the upper portion of end wall 4, and, aeration bar 11 which the horizontally disposed in the lower portion of influent chamber 7 near end wall 4. Wastewater and sewage enter the influent chamber 7 through influent line 10, and are aggitated and aerated therein by air bubbles emanating from aeration bar 11. Aeration bar 11 is sealed at its lateral extremes, has holes drilled along its length and is transversely disposed equidistant from side walls 2 and 3. The aeration bar 11 is continuously supplied with pressurized air from any convenient remote means, usually located above ground for ease of maintenance. We have found that an air pump supplying approximately 1.59 cubic feet of air per minute produces good results for an influent chamber of 521 gallons. The aeration bar 11 of the present invention is approximately half, or less than the width of the vessel, so as to produce the most turbulence centrally between side walls 2 and 3. The liquid flow produced by aeration bar 11 tends to be circular, when viewed from the side of the vessel, and tends to "sweep" particulate solids away from the lateral passages, 12 and 13, through transverse wall 9.

Transverse wall 9 is sealed against the top 6, side walls 2 and 3, and bottom 1, except for two lower, lateral, rectangular flow passages 12 and 13. The width of each of these lateral passages is one-fourth the width of the vessel. The height of each lateral passage is substantial when compared to that of some other designs (where the transverse wall approaches, but does not quite seal against the vessel floor). We have found that a lateral passage height of about 6-inches is optimal to avoid their being clogged by the occasional, but almost inevitable introduction of sewage which is highly resistant to biodegradation (such as a disposable diaper liner). On the other hand, lateral passages of too much height tend to create undesirable turbulence in the effluent chamber 8. Accordingly, we have found that the height of the lateral passages should not exceed one-eighth the height of the effluent chamber 8.

The effluent chamber 8, has three inclined walls 14, 15 and 16 which direct solids settling in the effluent chamber 8, back through the lateral flow passages 12 and 13. The first inclined wall 14 extends transversely from side walls 2 and 3, and its lower portion intersects the floor of the vessel 1 near transverse wall 9. From said lower intersection the wall is inclined upward towards end wall 5, at approximately a 45° angle from horizontal (35° to 50° is satisfactory) until it intersects end wall 5.

Inclined walls 15 and 1 extend longitudinally between transverse wall 9, and inclined wall 14, forming a wedge shaped structure sloping from a centrally high point down to the centrally disposed edges of lateral passages 12 and 13. We have found a 45° angle from horizontal to be optimal, but any angle from 35° to 50° produces satisfactory results.

The effluent chamber 8, is also with discharge fittings 17, and discharge line 18. Discharge line 18 is generally horizontal and penetrates the upper portion of end wall 5. Adapted to said discharge line 18, are discharge fittings 17. In their simplest form discharge fittings 17 are a 90° elbow, extending downward into the effluent chamber, the bottom of said elbow being fitted with a pipe "T" which is open laterally. The purpose of said fitting is to direct the liquid being discharged through at least two 90° turns before it enters the effluent line 17, thereby further discouraging particulate matter from entering the effluent line 17. Instead of a 90° elbow a vertically disposed "clean out T" may be used, so as to provide easy access to the discharge fitting 17, or effluent line 18, in case either of those do become clogged by non-biodegradable material.

After waste has been finely divided, aerated and biodegraded in the influent chamber 7, a portion of that pretreated waste flows through lateral passages 12 and 13, and enters effluent chamber 8. Waste initially entering the effluent chamber 8 ordinarily contains liquid and finely divided solids, in a fairly homogeneous mixture. In the effluent chamber 8, quiescent conditions exist, and as the liquid migrates gradually upward, the particulate matter tends to settle downward. As the particulate matter settles downward inclined surfaces 14, 15 and 16 direct said particles back into the influent chamber 7, through lateral passages 12 and 13. When these particles re-enter the influent chamber 7, they are subject to further mechanical division, aeration and biodegradation.

Tests with units designed as aforesaid show that a vessel of approximately 1000 gallon total volume (being about 8 feet long, 5 feet wide and 5 feet high) are capable of treating 500 gallons of domestic sewage per day, with the effluent conforming to National Sanitation Foundation Standard 40 for Individual Aerobic Wastewater Treatment Plants (revised 1983). Tests indicate that units designed as aforesaid are approximately 95% efficient in removing suspended solids, and 92% efficient in reduction of biochemical oxygen demand. The effluent showed no evidence of odor, oily film significant ph change or foam during any of the tests conducted, and effluent color remained below 15 units.

The foregoing description is illustrative and exemplary of the invention, and various changes may be made without departing from the scope and spirit of the invention.

What is claimed is:

1. A containerized wastewater treatment apparatus, suitable for sub soil installation, comprising:

a) a liquid sealed vessel having a substantially horizontal floor, two substantially vertical end walls and left and right sidewalls, and a substantially horizontal top, defining a generally hollow interior with a given width;

b) a substantially horizontal influent line extending through an upper part of a first of the end walls c) a substantially horizontal effluent line extending through an upper part of the second of the end walls;

d) a substantially vertical transverse wall positioned within the interior of the vessel, between the influent line and the effluent line, said wall sealingly extending upward to the top of the vessel, transversely to the left and right side walls, and downward to the floor of the vessel, and having a height dividing the vessel into influent chamber and effluent chamber, said transverse wall having two flow passages positioned at its lower left and lower right corners of the transverse wall, each said passage being substantially one fourth the width of the vessel and substantially six inches in height;

e) a horizontal aeration pipe within the interior of the vessel, positioned centrally between said right and left side walls of the vessel, near the lower portion of the influent chamber opposite from the transverse wall, said pipe having a length which is equal to or less than one-half the width of the vessel, said pipe being sealed at its lateral ends, having holes drilled along its length and supplied with air pressure from remote means, so as to produce turbulent aeration within the influent chamber;

f) three generally planar inclined surfaces, within the interior of the vessel, at the lower portion of the effluent chamber, for directing settling solids in the effluent chamber back through the two flow passages in the transverse wall, a first inclined surface extending transversely to the left and right side walls and having a lower portion which intersects the floor of the vessel near the transverse wall, and having an upper portion which intersects the second end wall, the second and third inclined surfaces forming a centrally positioned wedge shaped structure extending longitudinally between the transverse wall and the first inclined surface, said second and third surfaces lack having a lower portion which intersects the floor of the vessel at a line contiguous with the interiorly disposed edges of the flow passages in the transverse wall; and, g) discharge pipe fittings adapted to the effluent line and extending downward therefrom, said discharge pipe fittings containing at least two substantially 90° turns below a fluid level in the vessel, through which effluent is directed before entering the effluent line.

2. The apparatus of claim 1 wherein the inclined surfaces each form an angle from 35° to 50° from horizontal.

3. The apparatus of claim 1 wherein the discharge fittings are constructed of a 90° pipe elbow which is adapted to the effluent line and to the central leg of a pipe "T" mounted below said pipe elbow.

4. The apparatus of claim 1 wherein the height of the lateral passages of the transverse wall is less than 6-inches, but do not reach the floor of the vessel.

5. The apparatus of claim 1 wherein the height of the lateral passages of the transverse wall is greater than 6-inches, but equal to or less than one-eighth the height of the transverse wall.

* * * * *